United States Patent
Klabunde

(10) Patent No.: US 9,619,931 B1
(45) Date of Patent: Apr. 11, 2017

(54) DYNAMIC CONTROL OF A LIGHT BOX SYSTEM

(71) Applicant: Electronic Arts Inc., Redwood City, CA (US)

(72) Inventor: Noah Klabunde, Hersham (GB)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 14/806,474

(22) Filed: Jul. 22, 2015

(51) Int. Cl.
| | |
|---|---|
| *G06T 15/50* | (2011.01) |
| *F21V 33/00* | (2006.01) |
| *G06F 17/30* | (2006.01) |
| *H04N 5/222* | (2006.01) |
| *F21Y 101/02* | (2006.01) |

(52) U.S. Cl.
CPC ........ *G06T 15/506* (2013.01); *F21V 33/0052* (2013.01); *G06F 17/30589* (2013.01); *H04N 5/2224* (2013.01); *F21Y 2101/02* (2013.01); *G06T 2215/16* (2013.01)

(58) Field of Classification Search
CPC ........................... A63F 2300/66; G06F 3/0481
USPC ................ 345/426; 463/31, 32, 33, 34
See application file for complete search history.

(56) References Cited

U.S. PATENT DOCUMENTS

| | | | | |
|---|---|---|---|---|
| 2003/0202120 | A1* | 10/2003 | Mack | G06T 15/20 348/578 |
| 2005/0276441 | A1* | 12/2005 | Debevec | H04N 5/222 382/100 |
| 2007/0091178 | A1* | 4/2007 | Cotter | G06K 9/3216 348/159 |
| 2010/0049488 | A1* | 2/2010 | Benitez | G06T 15/506 703/6 |
| 2014/0378222 | A1* | 12/2014 | Balakrishnan | G06T 15/20 463/31 |
| 2015/0250041 | A1* | 9/2015 | Jobe | H05B 37/0254 315/151 |
| 2015/0345736 | A1* | 12/2015 | Colacilli | F21V 5/007 362/6 |

OTHER PUBLICATIONS

"Gravity—Framestore", author unknown, posted Oct. 2013, retrieved Aug. 28, 2015, http://www.framestore.com/work/gravity, 8 pgs.
"Gravity: vfx that's anything but down to earth", Mike Seymour, posted Oct. 8, 2013, retrieved Aug. 28, 2015, http://www.fxguide.com/featured/gravity/, 34 pgs.

* cited by examiner

*Primary Examiner* — Thomas Lett
(74) *Attorney, Agent, or Firm* — Knobbe, Martens, Olson & Bear LLP

(57) ABSTRACT

This disclosure relates to systems and methods for controlling a light box system. The light box system can be used to create lighting for a virtual environment. The light box system, also referred to as a light box, can be formed from a plurality of walls that form a room-like structure. Each wall of the light box can include a plurality of light projection elements. The light projection elements can be light emitting diodes (LED) that can project light within the interior of the light box. The light projection elements can output light towards the interior of the light box in order to generate calculated light output for a virtual environment. The lighting characteristics of the virtual environment can be modified to change the calculated lighting output for a virtual environment.

20 Claims, 10 Drawing Sheets

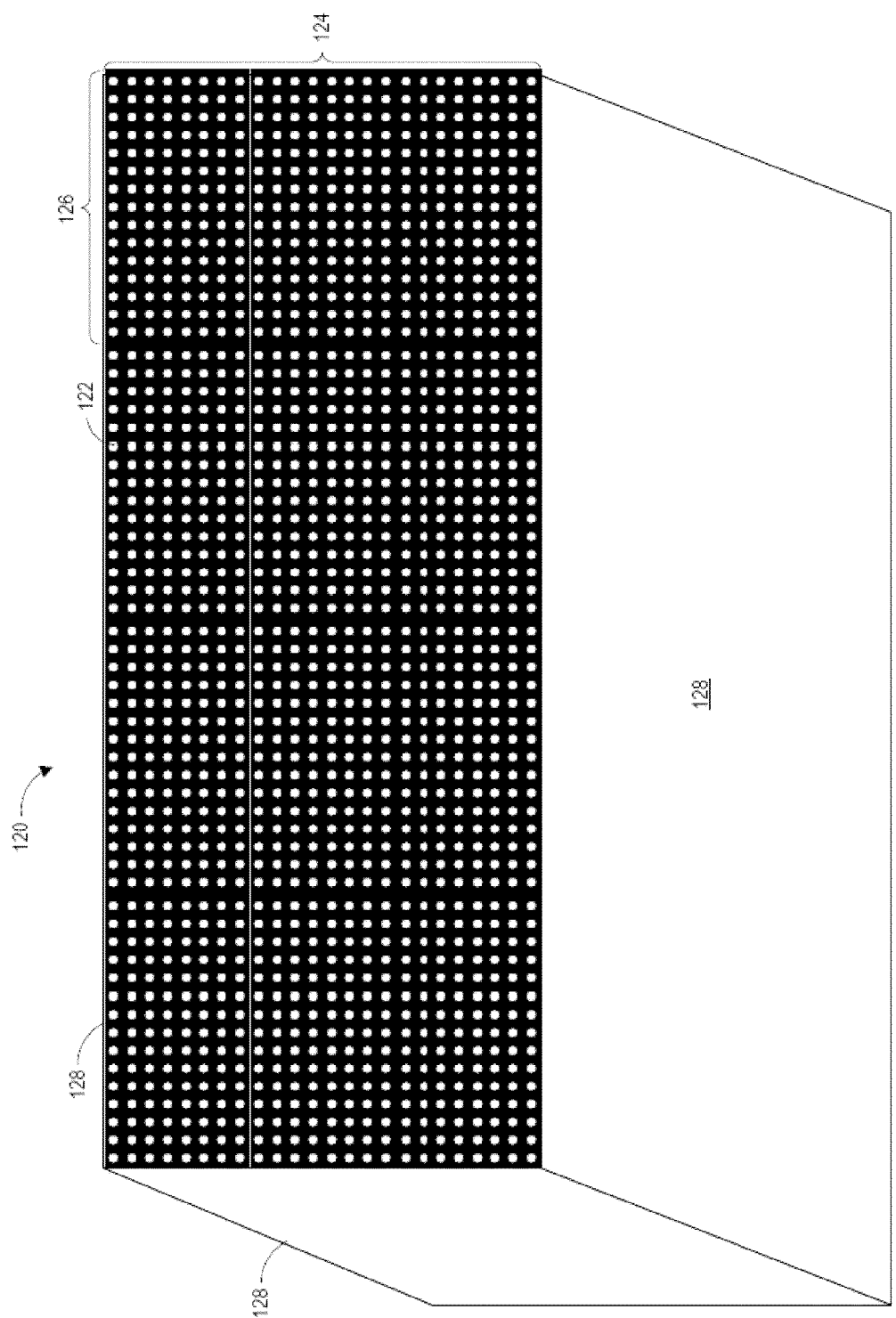

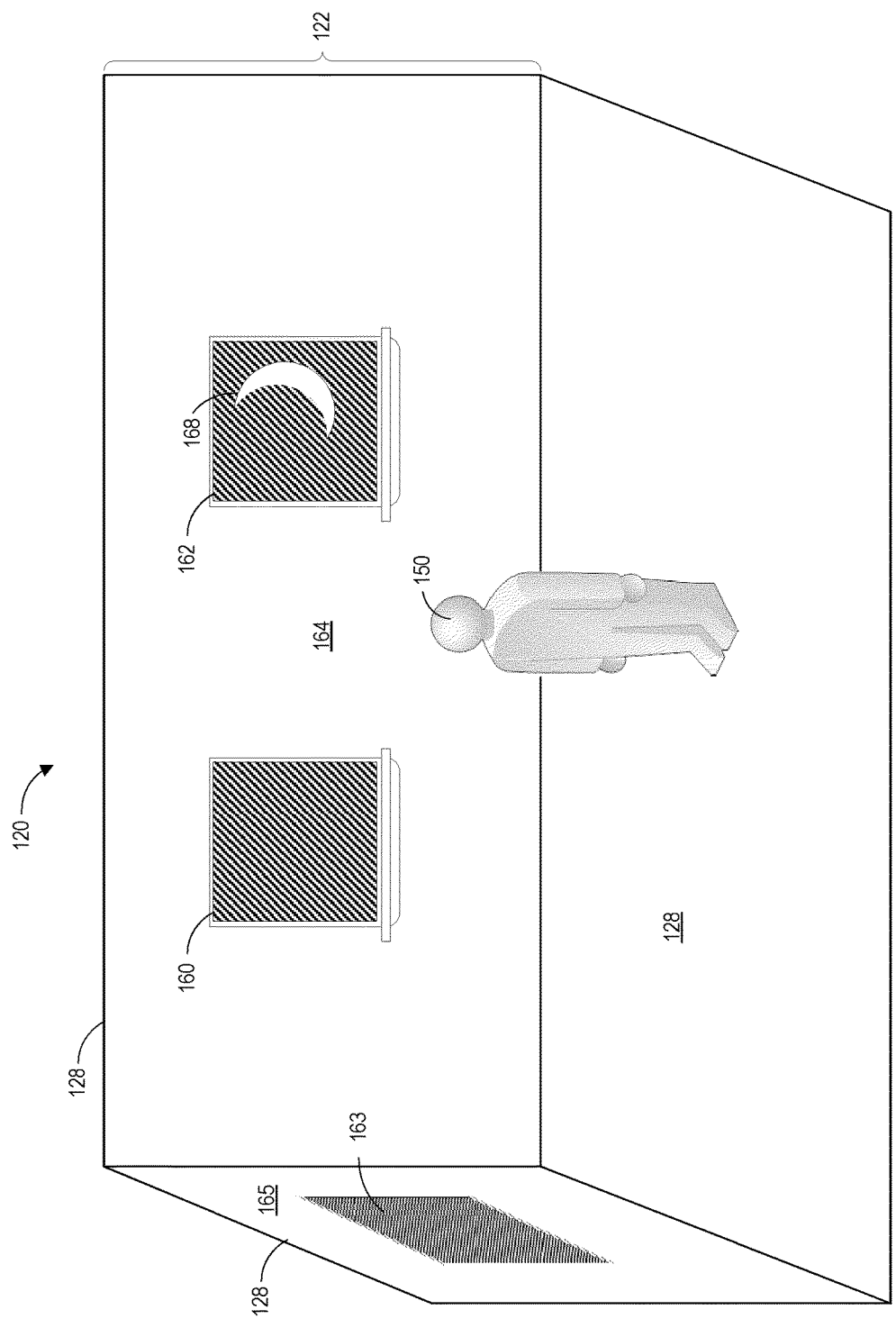

DYNAMIC CONTROL OF A LIGHT BOX SYSTEM

BACKGROUND

During film production, motion capture, or other video capture, having proper lighting on an actor or object can be an important factor during the filming of a scene. Physical lighting devices can be used to create the desired lighting effects on set. However, when filming a scene in a virtual environment, such as in space, it can be a difficult process to determine the correct lighting during a scene. For example, a film can be created using a "green screen," and during post production lighting effects can be introduced using post processing techniques. This can be a time consuming and expensive process. Some film productions have used large screens, such as light emitting diode (LED) screens to produce the light for a virtual environment. However, this can be a difficult process as the entire sequence of lighting events for a scene needs to be created and prerendered prior to filming. During filming, if changes to the scene need to be made, production must stop until the changes to the scene can be made the environment is rendered again. This can be difficult, time consuming, and costly process.

SUMMARY OF EMBODIMENTS

The systems, methods and devices of this disclosure each have several innovative aspects, no single one of which is solely responsible for the all of the desirable attributes disclosed herein.

One embodiment discloses a computer-implemented method for dynamically controlling the operation of a light box system, the method comprising: by a hardware processor executing a light box control application, loading a virtual environment from an environment data store, the virtual environment comprising a plurality of environment elements; loading light box configuration information from a light box system, the light box configuration information identifying a plurality of light projection elements disposed within the light box system; determining a location of the light box within a portion of the virtual environment; determining lighting parameters associated with environment elements within the portion of the virtual environment; rendering the portion of the virtual environment based, at least in part, on the lighting parameters associated with the environment elements and the location of the light box within the virtual environment; and generating instructions controlling the output of at least a subset of the plurality of the light projection elements within the light box, wherein the output of the light projection elements is based, at least in part, on the rendering of the portion of the virtual environment.

Another embodiment discloses a light box control system comprising: a data store configured to store environment data; a hardware processor in communication with the data store and a light box interface, the light box system interface configured to communicate with a light box system, the hardware processor configured to execute a light box control application, the light box control application configured to: load a virtual environment based, at least in part, on environment data stored in the data store, the virtual environment comprising a plurality of environment elements; load light box configuration information associated with the light box system, the light box configuration information identifying a plurality of light projection elements disposed within the light box system; determine a location of the light box system within a portion of the virtual environment; render the portion of the virtual environment based, at least in part, on lighting parameters associated with the environment elements and the location of the light box within the virtual environment; calculate light output data for at least a subset of the plurality of light projection elements based, at least in part, on the rendered virtual environment; and generate instructions configured to control the output of at least the subset of the plurality of the light projection elements within the light box system comprising the light output data.

Another embodiment discloses a non-transitory computer readable medium comprising computer-executable instructions for dynamically controlling the operation of a light box system that, when executed by a computer, cause the computer to perform a method comprising: loading a virtual environment from an environment data store, the virtual environment comprising a plurality of environment elements; loading light box configuration information from a light box system, the light box configuration information identifying a plurality of light projection elements disposed within the light box system; determining a location of a representation of the light box within a portion of the virtual environment; rendering the portion of the virtual environment based, at least in part, on the lighting parameters associated with the environment elements and the location of the light box within the virtual environment; and generating instructions controlling the output of at least a subset of the plurality of the light projection elements within the light box, wherein the output of the light projection elements is based, at least in part, on the rendering of the portion of the virtual environment.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 2A and 2B illustrates embodiments of a light box system.

FIGS. 3A and 3B illustrate an embodiment of a virtual environment generated within a light box system.

DETAILED DESCRIPTION OF EMBODIMENTS

Overview

Figure 1A:
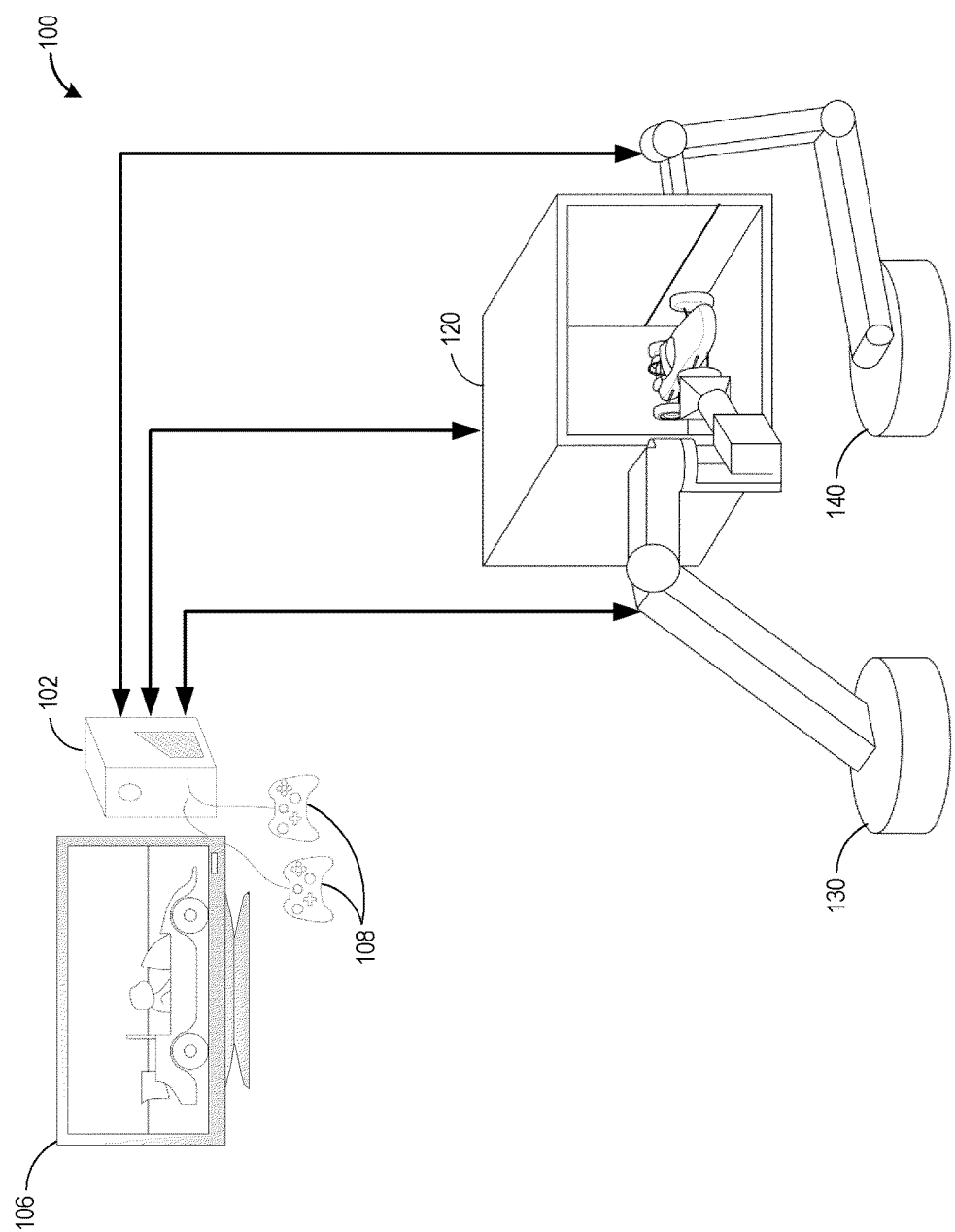
FIGS. 1A and 1B illustrate embodiments of a light box environment.

This disclosure relates to systems and methods for controlling a light box system. The light box system can be used to create lighting for a virtual environment for a film segment. The light box system, also referred to as a light box, can be formed from a plurality of walls that form a room-like structure. For example, the light box may include bottom, top, and side walls. In some embodiments, each wall of the light box can include a plurality of light projection elements. The light projection elements can be light emitting diodes (LED) that can project light within the interior of the light box. In some embodiments, the light projection elements substantially cover the entire light box, including the bottom, top, and side walls of the light box. The light projection elements are configured to output light towards the interior of the light box in order to generate calculated light output for a virtual environment. For example, the light box can be used to recreate a virtual environment, such as space, a stadium, a house, or any virtual environment. The lighting characteristics of the virtual environment can be modified to change the calculated lighting output for a virtual environment. For example, a position of the sun can be changed, the type of light source can be changed (for example, replacing the sun with the moon), or other types of changes to the virtual environment can be made in order to change the calculated light output for the light projection elements.

The light projection elements and the virtual environment can be controlled by a virtual environment control application. The virtual environment control application can load a virtual environment into an environment engine. The virtual environment can be stored in an environment data store. The environment engine can control and manipulate the virtual environment in order to position the virtual environment within the light box structure. For example, the virtual environment may be a castle, a city, a building, a cave, or other type of three dimensional environment. The virtual environment can be any type of three-dimensional environment that is loaded into the environment engine. The virtual environment includes virtual environment elements that are used to form the virtual environment. For example, the environment elements can include terrain (such as, for example, mountains, valleys, streets, water, snow, grass, and the like), objects (such as, for example, trees, bushes, rocks, buildings walls, and the like), and other elements within the environment.

The environment engine can be used to navigate through the virtual environment and can output any location of the virtual environment within the light box structure. The light box can function like a large inward facing television screen that may substantially cover the entire light box. From the interior of the light box, it may appear as if an actor was located within the selected location of the virtual environment. The environment engine can emulate and calculate the lighting based on the environment element parameters of the virtual environment. The interior of the light box can be used as focal point for the environment engine to calculate and generate the light output values for the light projection elements.

The calculated light output values can be based on the environment element characteristics within the virtual environment. For example, the virtual environment can include a light source, such as the sun, the light box can calculate output values for the light projection element based on the light source and the other environment elements within the virtual environment. In some embodiments, the calculated output values may include color, hue, saturation, light intensity, and other characteristics that can be used to control the output of a light projection element. The light box can provide lighting for an actor within the light box structure that emulates the virtual environment lighting. The lighting calculated for the virtual environment can be output and projected onto the actor within the light box in order to recreate the light corresponding to a determined location and setting within the virtual environment. In some embodiments, the light box can produce lifelike lighting during a filming segment. For example, the light box can create the proper shadows on a character at a specified time of day, create reflections on a football player's helmet within a stadium, generate lighting for an imaginary world with a green sun, or generate lighting associated with another virtual environment. The calculated lighting can be rendered and output during the capture of a film segment. In some embodiments, this can save significant time and reduce the post production costs of generating lighting effects after the film segment has been captured. The environment engine can also communicate with the camera control application in order to control the operation of the motion control camera system.

In some embodiments, the environment engine can dynamically modify the virtual environment at any time. The environment engine can render and calculate the output for the light box dynamically. In some embodiments, the virtual environment can be continuously rendered, rendered at a defined frequency, or aperiodically rendered, in order to output the calculated light values to the light box for visualization of the virtual environment within the light box. The parameters of the environment elements can be modified by the environment engine. The environment engine can dynamically modify the light output associated with a location within a virtual environment by modifying the parameters of the environment elements. For example, the environment engine can change lighting parameters of a light source (such as brightening or dimming the light source), change the type of a light source (such as replacing the sun with the moon), change the position of a light source (such as moving the position of a light within a bedroom), change position of an environment element within the virtual environment (such as opening or closing a window or door), and/or perform other modifications to the virtual environment. In some embodiments, a virtual environment may have defined constraints that determine the type of modifications that can be performed on environment elements within the virtual environment. For example, the position of the sun may only move through a defined arc. In some embodiments, the environment engine can output the instructions to the light projection element using high dynamic range (HDR) lighting. HDR lighting can be used to output a more diverse lighting range.

In some embodiments, the environment engine can generate movement of the virtual environment within the light box. The virtual environment can be moved along a defined path within the virtual environment. With reference to a virtual environment of a city, a determined film segment may entail an actor driving down a city street and making a left turn down a road. The actor may be sitting in a car located within the light box to simulate driving through the city. The environment engine can move the virtual environment along a defined path relative to the light box, at a speed in accordance with the parameters of the film segment. The movement of the virtual environment within the light box can provide the appearance that the actor is moving along the defined path. The light box can generate the lighting associated with driving through the city, such as street lights reflecting off the surface of the vehicle and other lighting effects. The environment engine can modify the film segment dynamically according to any changes that may want to be made to the film segment. For example, the environment engine can change the characteristics associated with movement of the vehicle within the virtual environment (such as the speed), the driving path of the vehicle (such as turn right instead of left), lighting characteristics within the virtual environment (such as changing the time of day, adding additional light sources, and the like), or any other modification to the virtual environment and/or film segment. The camera control application can also modify the operation of the motion control camera system during the filming.

In some embodiments, the output generated by the light projection elements can be more coarse than a desired appearance of the virtual environment. For example, the light box may be used to create correct lighting on the actors and not necessarily create the final environment for the film segment. In some embodiments, it can be beneficial to utilize a masking procedure in order to remove the light box structure from the captured video segment. For example, the light projection elements can pulse at an imperceptible rate. The system can then use the data to differentiate between the light box and the actors and/or other physical objects within the light box. A system, such as the virtual environment control application or another post-processing system, can be configured to automatically remove the light box from a filmed sequence.

In some embodiments, the dynamic control of the virtual environment by the environment engine can greatly enhance video production by creating real-time lighting effects in virtual environments. Additionally, as opposed to green screen the actor can visualize the actual virtual environment. The systems and methods can create dynamic lighting for recording film segments within virtual environments, which, in some embodiments, can more lifelike lighting and greatly reduce the amount of post-processing.

Although this disclosure focuses on generating light for video production, it should be understood that embodiments described herein can be used with other types of applications that utilize dynamic lighting. For example, an application for taking photographs in virtual environments may use one or more embodiments of the present disclosure.

Overview of Light Box Environment

Figure 1B:
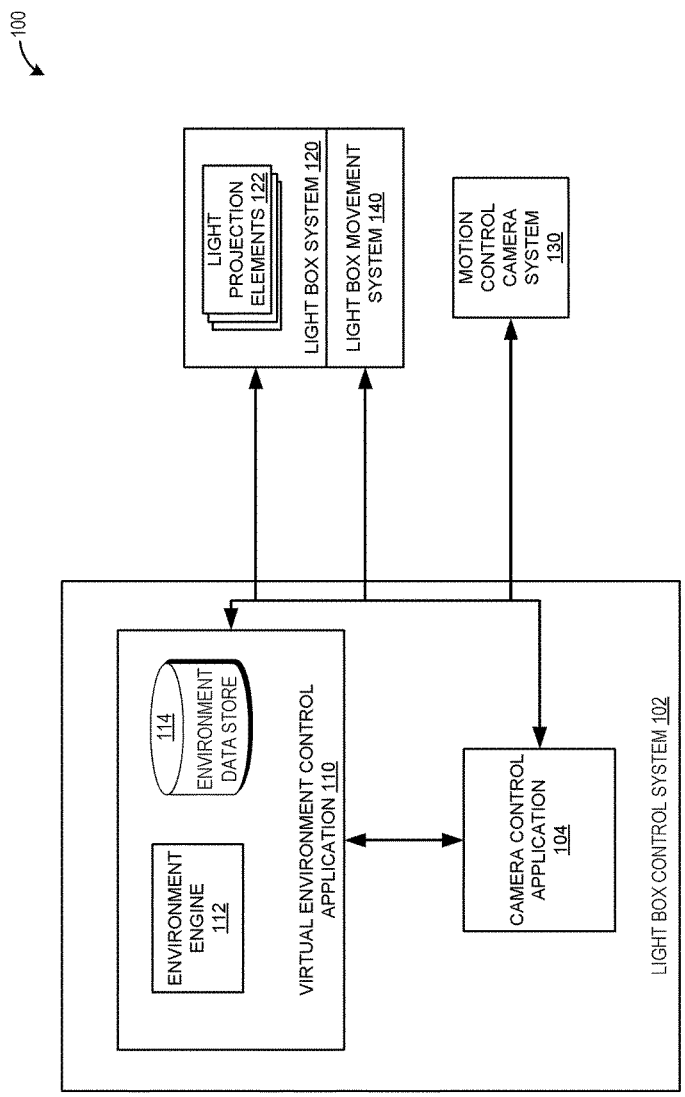

FIGS. 1A and 1B illustrates embodiments of a light box environment 100. FIG. 1A illustrates an embodiment of a physical implementation of a light box environment 100. FIG. 1B provides a block diagram illustrating an embodiment of the light box environment 100. The light box environment 100 includes a light box system 120, a light box control system 102, a virtual environment control application 110, a camera control application 104, a motion control camera system 130, and light box movement control system 140. The light box control system 102 can be configured to control the operation of the light box system 120 and the motion control camera system 130.

Light Box System

Figure 2A:
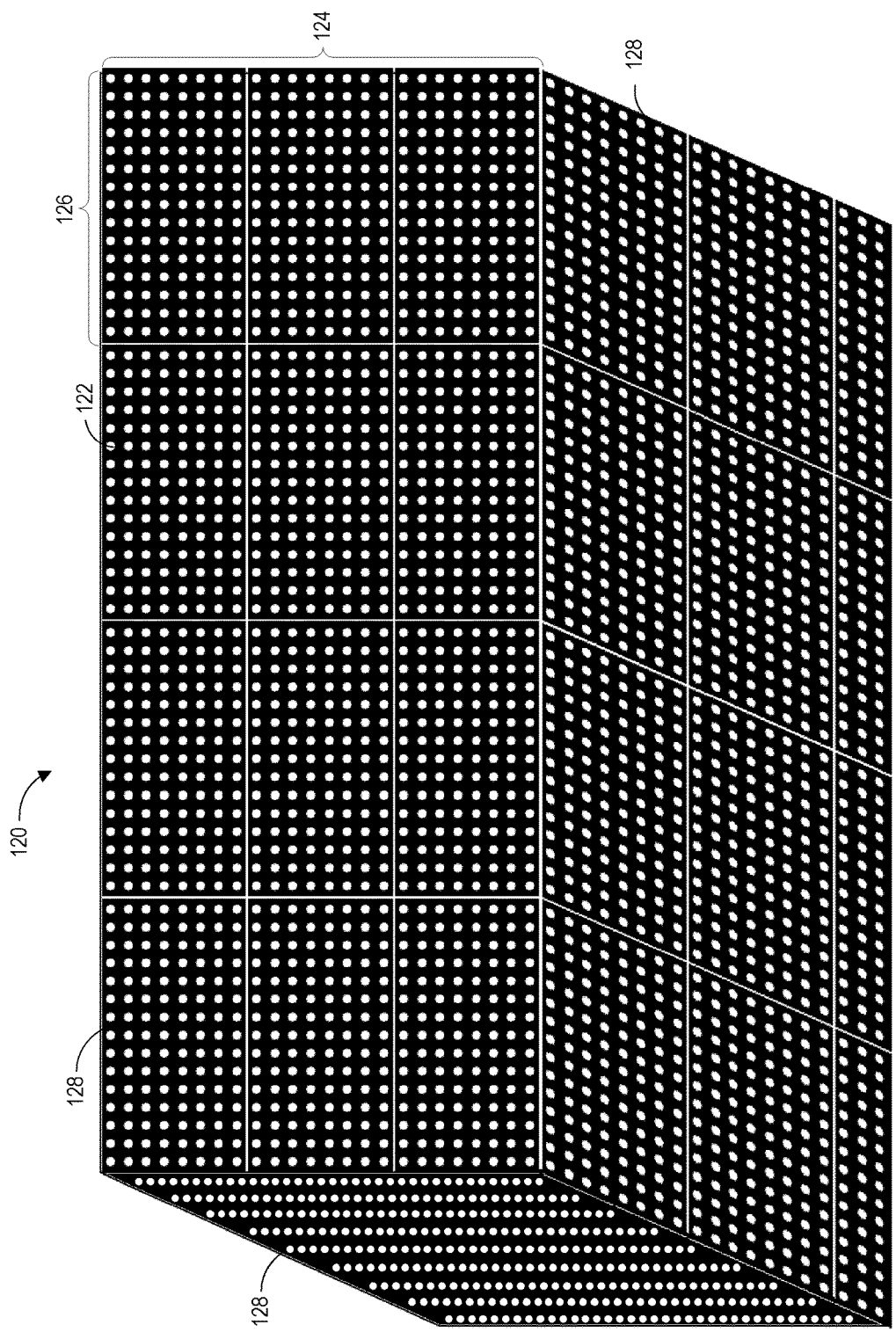

The light box system 120 can be described with additional reference to the embodiment of a light box system disclosed in FIGS. 2A and 2B. The light box system 120 can comprise a plurality of walls 128 to form a box-like structure. Each wall within the structure can include a plurality of light projection elements 122. In some embodiments, the light box can be constructed to resemble a hollow cube or rectangular prism, such as illustrated in FIG. 1A. The size and shape of the light box structure can vary dependent upon the specific configuration or application. For example, in one embodiment the light box can have a height and width greater than 20 feet, whereas in other embodiments the light box may be considerably smaller or larger. Additionally, the light box 120 is not limited to a box or rectangular structure. For example, in some embodiments, the light box 120 may be configured as a circular structure.

In some embodiments, the interior walls 128 of the light box 120 can be constructed of a plurality of panels 126, with each panel 126 comprising a plurality of light projection elements 122. For example, as illustrated in FIGS. 2A and 2B, a plurality of light projection elements 122 are disposed on a side wall 128 within the light box 120. In the embodiment illustrated in FIG. 2A, all of the illustrated walls of the light box structure 120 include light projection elements. In the embodiment illustrated in FIG. 2B, only a single wall of the light box structure 120 is illustrated as including light projection elements 122. In some embodiments, a plurality of walls 128 can include light projection elements 122. For example in some embodiments, such as in the embodiments illustrated in FIG. 1A, the top, bottom, and side walls 128 can include light projection elements 122. As illustrated, the plurality of light projection elements 122 can be configured in an array 124 covering substantially the entire wall 128. In some embodiments, the light projection elements 122 can be in different configurations, be located on less than all of the panels 126 and/or walls 128 within the light box 120. The size and density of the light projection elements 122 within the array 124 of may be dependent upon the physical and electrical characteristics of the light projection elements 122. In some embodiments, the light box 120 may include multiple different types, sizes, and/or shapes of light projection elements 122 within the light box. In some embodiments, the light projection elements 122 can be an array of LEDs. In some embodiments, the spacing of the light projection elements may be different, such that the spacing is not perfectly aligned in rows and columns.

The light projecting array 124 can function similar to a large screen, such as a large television screen configured to illuminate the interior of the light box 120. A light box 120 can include millions of individual light projection elements, each of which can be individually controlled or controlled in groups. In some embodiments, each pixel rendered within a virtual environment can correspond to an individual light projection element 122 that can be controlled by the light box control system 102. The light projection elements 122 can project light in accordance with the specifications of the make and manufacture of the light projection element 122. For example, the light projection element 122 can project a full range of colors of different hues, saturations, and other color parameters. Each light projection element 122 can be controlled in accordance within defined lighting specifications, based on instructions generated by the light box control system 102. The light projection elements 122 can act together as a giant screen to display moving sequences of light and color, such as a movie screen displaying a movie. The light projection elements 122 can be configured to output light towards the interior of the light box in order to generate calculated light output for a virtual environment. For example, the light box 120 can be used to recreate a virtual environment, such as space, a stadium, a house, or any virtual environment. The lighting within the light box can be changed by the light box control system 102 by manipulating the virtual environment, which can change the lighting within the light box wall without moving any physically lighting. In some embodiments, the light box 120 can be configured to output calculated illumination inside the light box 120 based on a defined space within the light box 120.

Light Box Movement Control System

In some embodiments, the light box system can include a light box movement control system 140. The movement control system 140 can be coupled to light box structure, as illustrated in the embodiment in FIG. 1A. The movement control system can be configured to move and manipulate the physical position of the light box. In some embodiments, the movement control system 140 can translate the light box along vertical and horizontal axes, rotate the light box around an axis, and/or otherwise manipulate the position of the light box structure. The movement control system 140 can include mechanical mechanisms, such as a lift or robotic arms, which can be controlled by the light box control system 102, the virtual environment control application 110, the camera control application 104, and/or another control system, such as a dedicated control system. In some embodiments, the movement control system can manipulate portions of the light box structure, such as individual panels 126, individual walls 128, and/or a combination of components of the light box structure to modify the size and shape of the light box structure.

Light Box Control System

The light box control system 102 can include one or more processors, such as central processing units (CPUs), graphics processing units (GPUs), and data storage combined or in separate elements. The light box control system 102 may include user input devices, such as the controllers 108 illustrated in FIG. 1A, or other input devices, such as, for example, a mouse, a keyboard, and the like. The light box control system 102 may include output devices, such as the display 106 illustrated in FIG. 1A, and/or other types of output devices. The light box control system 102 can be configured to execute software code for the operation of the virtual environment control application 110 and the camera control application 104. In some embodiments, the light box control system 102 can be a specialized computing device created for the dedicated purpose of controlling the light box system 120 and/or the motion control camera system 130. The light box control system 102 can be configured to communicate with the light box system 120 and/or the motion control camera system 130 using a particular application programming interface (API) and/or a particular hardware interface. In some embodiments, the light box control system 102 can communicate with light box system 120 and/or the motion control camera system 130 via a physical hardware interface, such as a wired connection, a wireless interface, such as a wireless network, or a combination thereof.

In some embodiments, the virtual environment control application 110 and the camera control application 104 can be executed on separate computing devices. For example, the virtual environment control application 110 may operate on a specialized computing device dedicated to the operation and control of the light box system 120, and the camera control application 104 may operate on a separate specialized computing device dedicated to the operation and control of the motion control camera system 130. In some embodiments, the light box control system 102 may be a general purpose computing device capable of executing the virtual environment application 110 and the camera control system 104, such as illustrated in FIG. 1A. For example, the computing device 100 may be a desktop computer, a workstation, a laptop, or another computing device. Components of an example embodiment of a computing device are described in more detail with respect to FIG. 6.

In general, the word "application," as used herein, refers to logic embodied in hardware or firmware, or to a collection of software instructions stored on a non-transitory, tangible computer-readable medium, possibly having entry and exit points, written in a programming language, such as, for example, C, C++, C#, or Java. A software application may be compiled and linked into an executable program, installed in a dynamic link library, or may be written in an interpreted programming language such as, for example, BASIC, Perl, or Python. It will be appreciated that software application may be callable from other applications or from themselves, and/or may be invoked in response to detected events or interrupts. Software applications may be stored in any type of computer-readable medium, such as a memory device (for example, random access, flash memory, and the like), an optical medium (for example, a CD, DVD, Blu-ray, and the like), firmware (for example, an EPROM), or any other storage medium. The software applications may be configured for execution by one or more CPUs in order to cause light box control system 102 to perform particular operations. Generally, the applications described herein refer to logical modules that may be combined with other modules or divided into sub-modules despite their physical organization or storage.

Virtual Environment Application

A virtual environment application 110 can be configured to be executed on the light box control system 102. The virtual environment application 110 should be understood to include software code that the light box control system 102 or another computing device can execute to controlling operation of the light box system 120. A virtual environment control application 110 may comprise software code that informs the light box control system 102 of processor instructions to execute, but may also include data used during execution of the application. For example, in the illustrated embodiment, the virtual environment control application includes an environment engine 112 and environment data 114.

Virtual Environment Engine

The environment engine 112 can be configured to execute, manipulate, and control a virtual environment. The environment engine 112 can generate instructions that can be output to the light box system 120 for controlling the operation of the light projection elements 122. The virtual environment engine 112 can be configured to control the light box system 120 based, at least in part, on information provided by the environment data store 114. The environment engine 112 can receive inputs from a user that enable the user to control and manipulate a virtual environment. The environment engine 112 can load a virtual environment from the environment data store 114. The environment engine 112 can control the output and display of the virtual environment on a local display (such as display 106) and of the light box system 120. The control of the display within the light box system 120 can be generated at the same time as the display on a local display 106, such as display 106 illustrated in FIG. 1A. For example, the environment engine may render and generate instructions for control of the light box system multiple times per second, such that the output to the light box system 120 is generated at substantially the same time as the manipulation of the virtual environment within the virtual environment control application 110.

In some embodiments, the environment engine 112 can receive configuration information associated with the light box system, such as the size of the light box system, the number of light projection elements, the type of light projection elements, the specifications of light projection elements, light projection element identifiers, and/or other information that can be used by the environment engine 112 to configure and position the virtual environment within the light box system 120. In some embodiments, this configuration information can be input manually, and in some embodiments it can be automatically determined and provided to the environment engine 112.

In some embodiments, the environment engine 112 can provide controls for a user to manipulate the virtual environment and control the positioning of the virtual environment for outputting within the light box system 120. The environment engine 112 can receive user inputs to control and manipulate the virtual environment according to constraints and parameters associated with the virtual environment. The virtual environment can be any type of three-dimensional environment that is loaded into the environment engine 112. For example, the virtual environment may be a castle, a city, a building, a cave, or other type of three dimensional environment. The virtual environment includes virtual environment elements that are used to form the virtual environment in virtual space. For example, the environment element can include terrain (such as, for example, mountains, valleys, streets, and the like), objects (such as, for example, trees, bushes, rocks, buildings walls, clouds, and the like), active entities (such as, for example, animals, people, robots, vehicles, and the like), and/or other elements within the environment. In some embodiments, each environment element can be defined by a set of parameters specific to the environment element. The environment engine 112 can manipulate environment element parameters within the virtual environment.

In some embodiments, the environment engine 112 may be limited by constraints of the virtual environment, for example, in some embodiments, only defined parameters of the virtual environment may be manipulated and controlled by the environment engine 112. The environment engine 112 can generate instructions for outputting the virtual environment within the light box system 120. During operation, the environment engine can emulate and calculate the outputs for the light box system at a location within the virtual environment based at least in part on a portion of the environment element parameters within the virtual environment. In some embodiments, a point or portion of the interior of the light box can be used as focal point for the environment engine to calculate and generate the light output values for the light projection elements. The environment engine 112 can utilize the configuration information of the light box system 120 to determine output commands for the virtual environment. For example, in one embodiment, the environment engine 112 can use the size of the light box to determine the spatial location of the light projection elements within the light box to calculate instructions for control of the light projection elements.

In some embodiments, the environment engine 112 can be a game engine that can be used to control the operation of the virtual environment. The virtual environment can be a game environment from a video game application. The virtual environment may include virtual characters and/or other active virtual environment elements, which can be controlled manually or by game engine rules associated with the game environment. For example, a car racing game application may include other race cars that are moving within the environment. In a fantasy game environment, the virtual environment may include a dragon that is breathing fire. The environment engine 112 can be used to control the game environment within the light box. The environment engine 112 can be configured to execute a specific level within a game application and control the execution of environment from the perspective of a character within the game application. For example, in a racing game, the environment engine 112 could play through a specific racing level or course as a racer such that the light box is displaying the level within the game application relative to the racer within the environment.

In some embodiments, the environment engine 112 can be controlled by a controller and/or other system that could be used by an actor within the light box. The controller, such as a steering wheel controller, may be used to by an actor to play through the virtual environment within the light box. For example, the actor within the light box could drive through the environment, participate in a race between other racers, and/or interact with the environment in other ways.

Virtual Environment Data Store

The environment data store 114 can store environment data associated with the virtual environment. The virtual environment can include environment elements. Examples of environment elements can include terrain (such as, for example, mountains, valleys, streets, water, snow, grass, and the like), objects (such as, for example, trees, bushes, rocks, buildings walls, and the like), active entities (such as, for example, animals, people, characters, robots, vehicles, and the like), and other elements within a three dimensional environment. In some embodiments, each environment element can have a set of parameters, also referred to as environment element parameters, that define the behavior of the object within the virtual environment. For example, the parameters can include physical parameters, such as spatial information (for example, size, shape, height, width, location within the environment, and other characteristics associated with spatial location), appearance information (for example, color texture, skins, and other characteristics associated with the appearance of the object), and other information that can be used to define physical characteristics of the environment elements within the virtual environment. Some environment elements, such as active entities can include behavior parameters that can define how the entity behaves and interacts with the environment. For example, the behavior parameters may include artificial intelligence (AI) for controlling the behavior of the entity within the environment, a defined behavior (such as, for example, moving along a defined movement path, performing a defined set of actions, and the like), and/or other parameters that can be used define behavior of an entity within the virtual environment.

In some embodiments, the environment elements can include lighting parameters, which can define both passive and active lighting characteristics of an environment element. Passive light characteristics can define how light interacts with environment elements. The passive light characteristics can be based in part on the physical characteristics of the environment elements (for example, the type of material associated with the environment element). Active light characteristics can be used for environment elements that produce light, such as, for example, the sun, a light bulb, a fire, and/or other light producing environment elements. Environment elements with active light characteristics can be referred to as light sources. For example, the active characteristics can define characteristics of the light source, such as, for example, directionality of the light, the type of light, saturation, hue, intensity, and/or other information and other information associated with an environment element. Some environment elements can be configured to include dynamic light characteristics that can change active and passive light characteristics of environment elements within the environment. Some examples may include a pulsing light, an explosion, a dragon breathing fire, a gun firing, headlights turning on/off, and other changes that can dynamically change the lighting characteristics of environment elements within the virtual environment. The light parameters can be used by the environment engine to calculate lighting values at for each light projection element within the light box system. The environment elements may include some or all of the various parameters described above. For example, the lighting parameters of some environment elements can include passive and active lighting characteristics, such as, for example, a lamp with a shade, headlights on a vehicle, or a dragon breathing fire.

Camera System

The camera control application 104 can be in communication with the motion control camera control system 130. This camera control application 104 can be executed on the light box control system 102. One or more motion control camera systems 130 can be used to record video during a film segment. In some embodiments, multiple cameras can be used simultaneously. In some embodiments, the specific characteristic and functionality of the motion control camera systems 130 can be dependent on the specific hardware of the motion control camera system 130. The camera control application 104 can be used to control or provide instructions for the operation of the motion control camera system 130. For example, the camera control application 104 can output instructions to control the movement and capture functionalities of a camera during a film segment. With multiple cameras, the sequence can be recorded from multiple different angles. The camera control application may communicate with the motion control camera system via a camera interface or a specific API that the camera control application can use to provide instructions to the camera. In some embodiments, the virtual environment control application 110 provides instructions for operation of the camera to the camera control application 104, and the camera control application can generate the appropriate output for control of the motion control camera system. In some embodiments, the virtual environment control application 110 can provide instructions directly to the motion control camera system. The operation of the motion control camera system 130 can be synchronized with the operation of the light box system 120.

Virtual Environment Examples

Figure 3A:
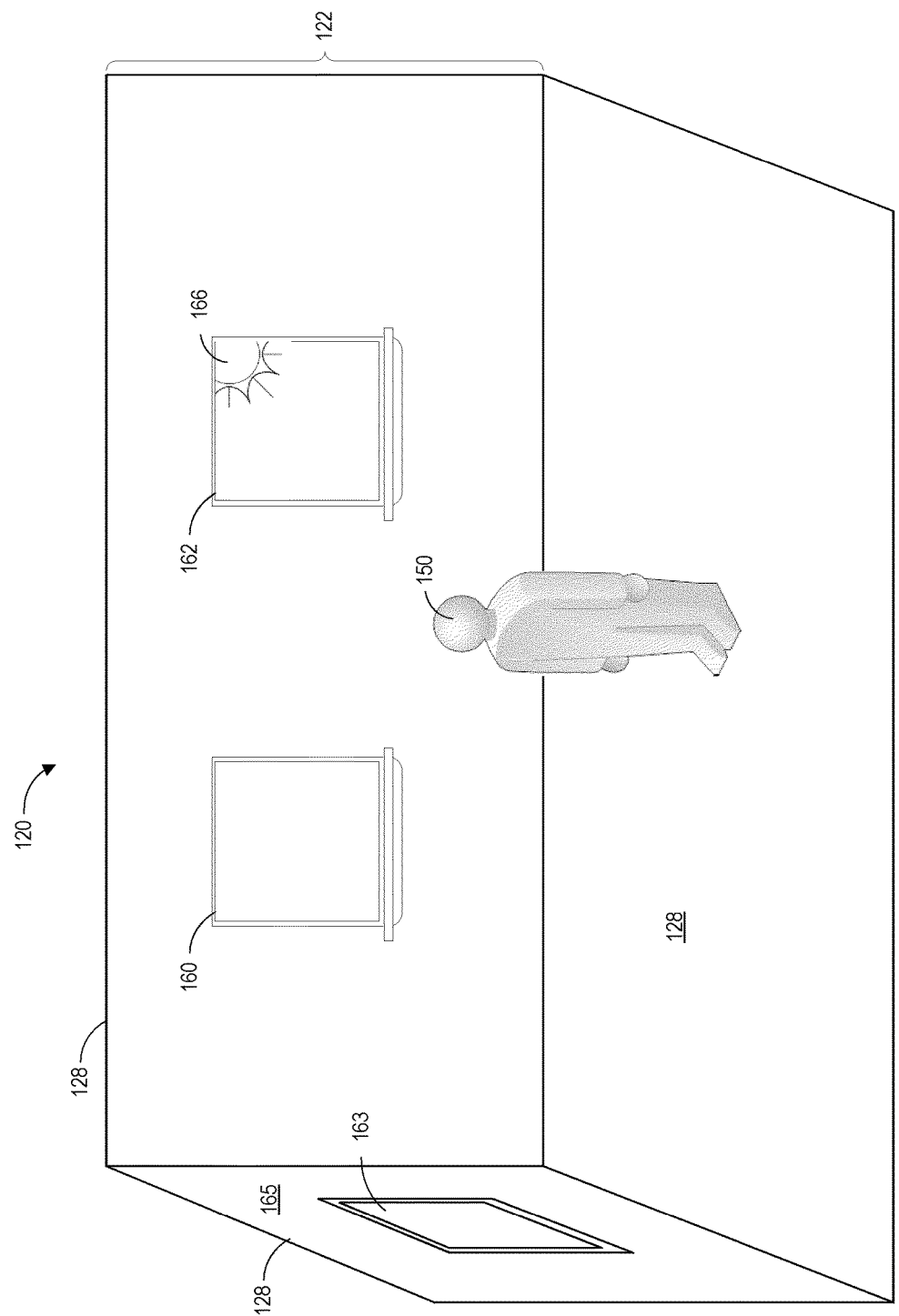

FIGS. 3A and 3B illustrate example embodiments of virtual environments output by the environment engine 112 within the light box system 120. In the illustrated embodiment, the environment engine outputs instructions for the light projection elements to generate a location within a virtual environment. The location of the virtual environment is the same in FIG. 3A and FIG. 3B. In FIG. 3A, the virtual environment is configured with a first set light parameters and in FIG. 3B, the virtual environment is configured with a second set of light parameters.

FIG. 3A illustrates an example embodiment of a virtual environment of a room. The virtual environment includes a plurality of environment elements. In this embodiment, the environment elements include a first window 160 and a second window 162, and a sun 166, positioned on the back wall 164. A third window 163 is positioned on the side wall 165. The instructions for the lighting output of the light projection elements are calculated based at least in part on the environment element parameters of at least a portion of the environment elements. For simplicity, the only environment element functioning as a light source within the virtual environment is the sun 166. However, any number of environment elements can be configured to act as light sources within the virtual environment. The first window 160, the second window 162, third window 163, and the walls 164, 165 have passive lighting parameters. The environment engine 112 can calculate a light value output for each light projection element at a position where the light projection element would intersect with the virtual environment. The light value output that is calculated can be based at least in part on the lighting parameters associated with one or more environment elements. As an illustrative example, the light coming through the second window 162 that would be output by the light projection element can be influenced by the angle of the sun, light intensity of the sun, the opacity of the window, and other factors that can be used to calculated an output value for the light projection element at the intersection of the light projection element with the virtual environment. Each environment element can have different parameters. For example, the first window 160 can have different parameters, such as a different opacity, than second window 162 and third window 163. The environment engine 112 can modify the parameters associated with the virtual environment in real time to change the output of the light projection elements. The light output within the light box is configured to encounter the actor 150 or other object within the light box as if they were actually located within the virtual environment created by the virtual environment engine.

FIG. 3B illustrates the same location within the virtual environment. In this embodiment, the virtual environment has been modified change the light source from the sun 166 to a new light source 168, the moon. The change of environment elements within the virtual environment changes the calculation of the output for each of the light projection elements. The output of the light projection elements is calculated to account for the change in the environment. The environment engine 112 can output the changes in real time and update the calculated output of each of the light projection elements. The different lighting parameters of the light source 168 can provide a change in light coming through the windows 160 and 162, thereby affecting the output of the light projection elements.

Figure 4A:
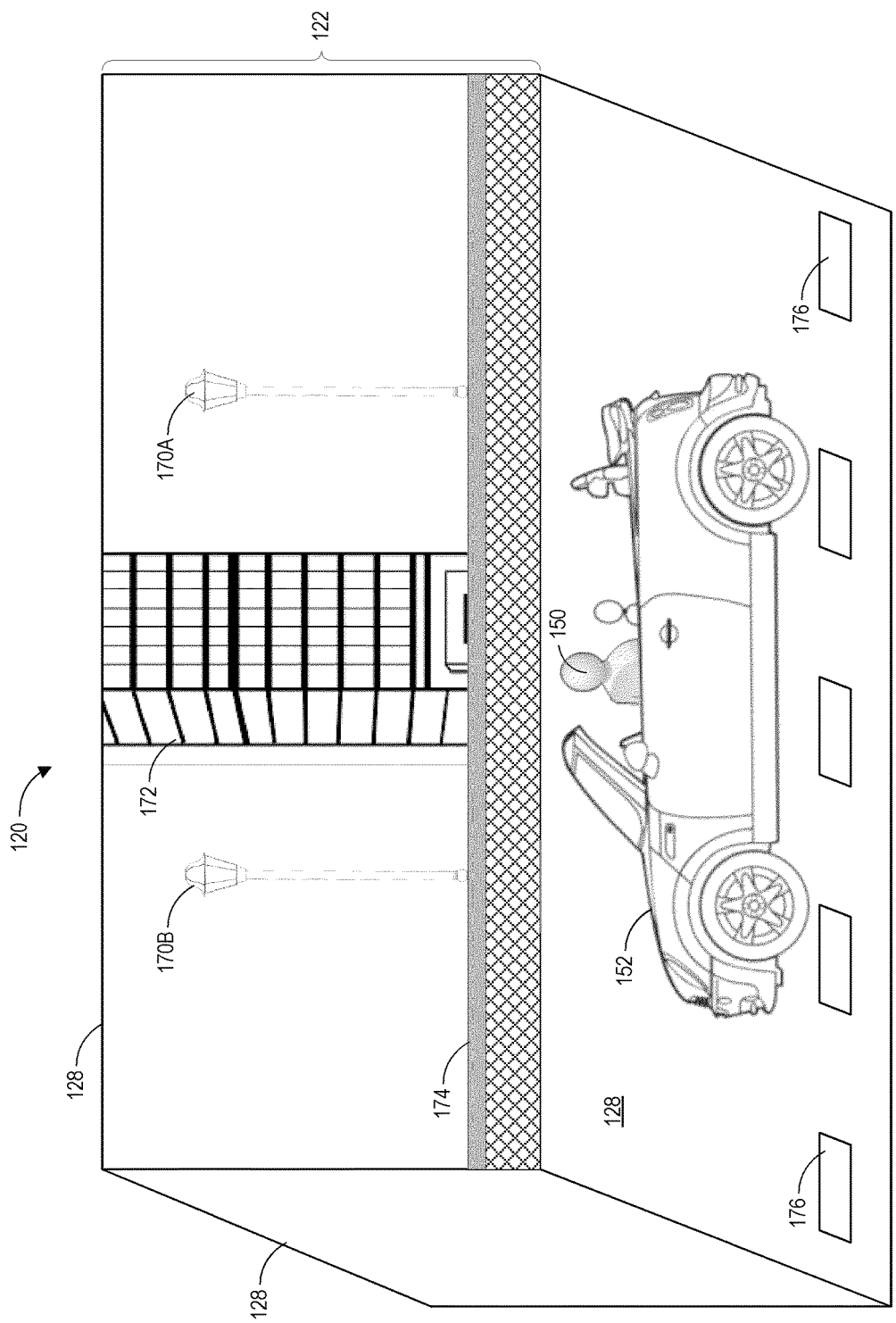
FIGS. 4A and 4B illustrate another embodiment of a virtual environment generated within a light box system.
Figure 4B:
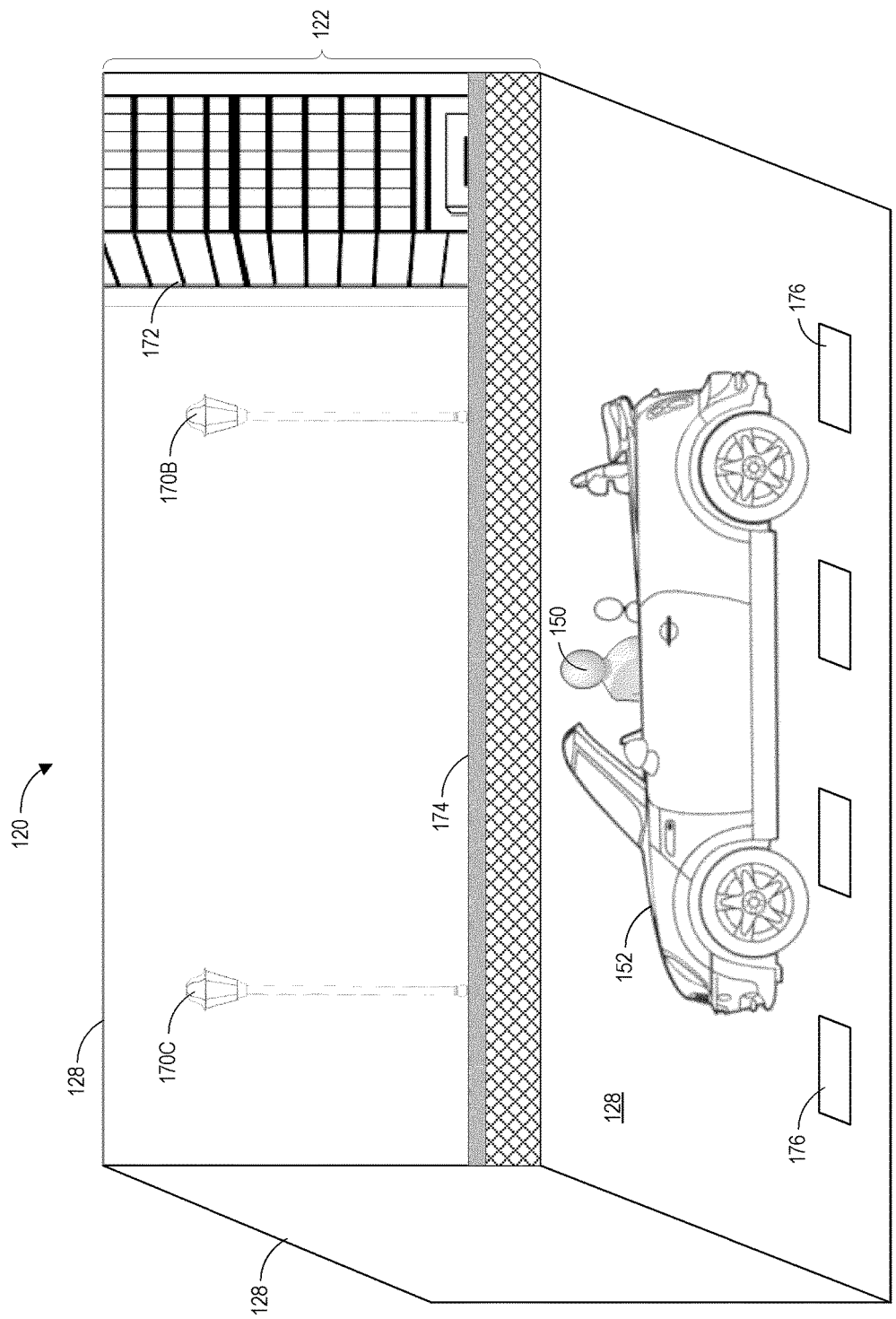

FIGS. 4A and 4B illustrate an embodiment of movement of the location of the light box within the virtual environment. In this embodiment, the virtual environment moves along a defined path relative to the light box. In this embodiment, the actor 150 is located within a physical model or a physical object 152. In this embodiment, the object 152 is a vehicle, however, the object could be any other type of physical object that is located within the light box with the actor. The object can be an actual object or a place holder object that the actor can interact with or user during recording of the film segment. Another example of a physical object positioned within a light box is illustrated in FIG. 1A.

The movement of the virtual environment relative to the light box can be dynamically controlled by the environment engine 112. In some embodiments, the physical object 152 may include a controller that can be used by the actor to control the movement of the virtual environment relative to the light box. For example, the actor 150 could drive through the environment, participate in a race between other racers, and/or interact with the environment in other ways. The movement sequence as illustrated in FIGS. 4A and 4B can be configured to create the appearance that the actor 150 is driving the vehicle 152. Movement of the vehicle within the virtual environment is illustrated as the vehicle moving from FIG. 4A to FIG. 4B, wherein FIG. A is at a first point in time and FIG. B is at a second point in time. The environment engine 112 manipulate the light box within virtual environment such that it gives the appearance that the character is moving. For example, the light posts 170A and 170B, the street lines 176, and the building 172 move toward the right side with light post 170B disappearing and 170C appearing. The fence 174 continues to be displayed. Each environment element can defined lighting parameters that can affect the output of the light projection elements. Even though not shown in the illustrated embodiment, the environment element parameters of the light post 170B can still be used to calculate the output of the light projection elements. As the virtual environment moves relative to the actor 150 and the vehicle 152, the lighting within the light box can create reflections and different lighting characteristics can be displayed on the vehicle as if it is moving. The virtual environment can move at a set rate such as the vehicle is moving at a rate of 50 miles per hour. The environment engine 112 can be configured to render the virtual environment and output instructions to the light projection element to generate the correct output during the operation of the movement sequence. The environment engine 112 is not limited to a defined or prerendered output of movement within the virtual environment. The environment engine can dynamically change aspects the virtual environment, such as the speed of movement, the movement path, and/or other characteristics during the execution and output of the virtual environment to the light box.

The environment engine 112 can modify parameters of the virtual environment in real time so that it can be changed dynamically at any time. The environment engine can change parameters associated with the movement sequence, for example, the speed of the vehicle can change, the movement path can be modified, or other parameters associated with the movement sequence. For example, the vehicle was originally scripted to drive down a road and then make a right turn, the environment engine could modify the movement make to make a left turn instead. The environment engine could also change the location within the virtual environment to any other place within the virtual environment. The environment engine can process any changes and output the changed output instructions to the light projection elements during the movement sequence. The movement sequence can be captured by the motion control camera system 130 based on instructions received from the camera control application 104.

Dynamic Control Process

Figure 5:
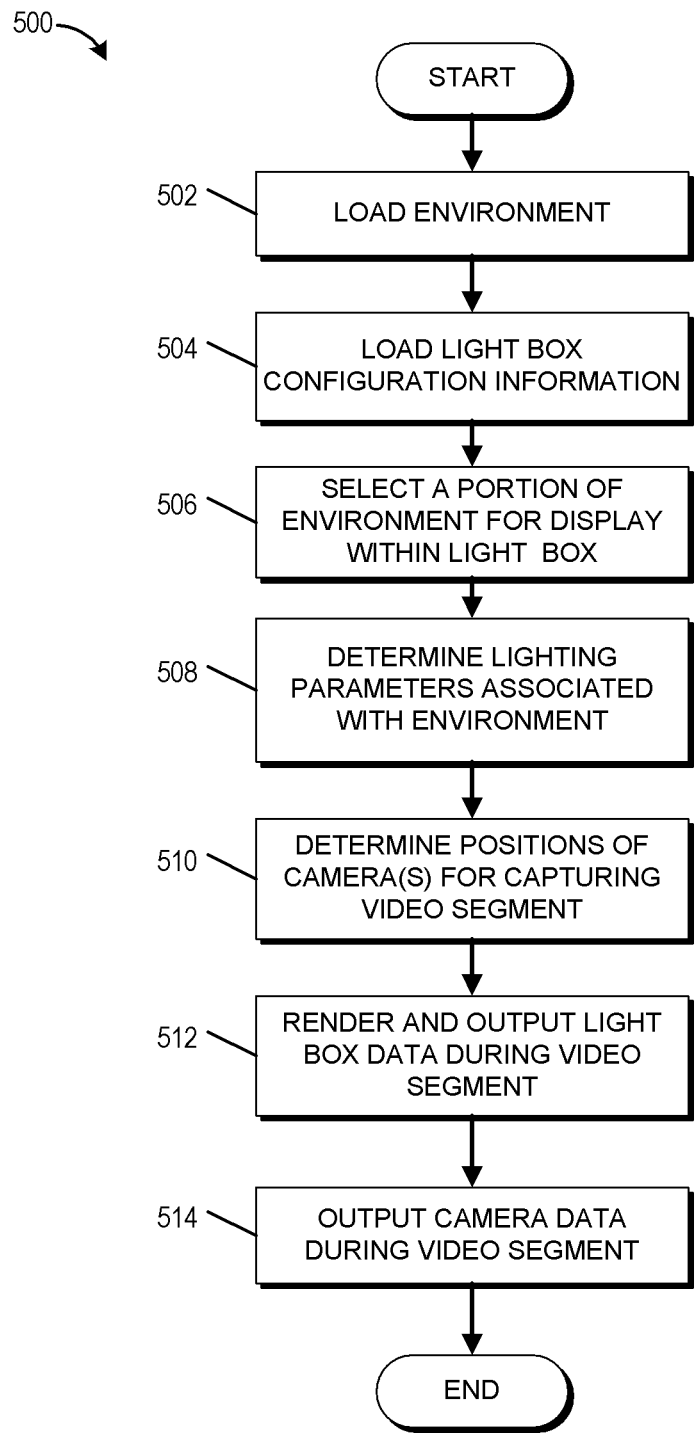
FIG. 5 illustrates an embodiment of a process for dynamic control of a light box system.

FIG. 5 illustrates an embodiment of a flowchart 500 of a process for dynamic control of a light box system. The process 500 can be implemented by any system that can process the lighting and environment data for output to a light box system. For example, the process 500, in whole or in part, can be implemented by an environment engine 112, a virtual environment control application 110, a light box control system 102, or other computing system. Although any number of systems, in whole or in part, can implement the process 500, to simplify discussion, the process 500 will be described with respect to particular systems. Further, although embodiments of the process 500 may be performed with respect to with respect to variations of system comprising light projection elements, to simplify discussion, the process 500 will be described with respect to the light box system 120.

At block 502, a virtual environment is loaded into the light box environment application. The virtual environment can be loaded from an environment data store. At block 504, the light box configuration information is loaded into the environment engine 112.

At block 506, a user can select a portion of the environment for display within the light box. In some embodiments, the virtual environment can be moved relative to the light box. In some embodiments, based on the light box configuration information, the system can determine a representation of the light box that can be displayed for manipulation within the environment engine 112. The system can determine the location of the light box within the virtual environment. This information can be used to establish the location information of each of the light projection elements relative to the virtual environment. The relative location of the light projection elements can be determined based, at least in part, on the environment data and the light box configuration information.

At block 508, the lighting characteristics associated with that environment can be determined. The environment element parameters associated with the virtual environment can be modified for the specific video sequence. In some embodiments, the environment can load default parameters for each of the environment elements with the virtual environment. In some embodiments, a configuration or video segment file may be used to determine establish initial parameters. The environment element parameters can be modified to account for desired changes to the virtual environment. For example, light parameter information for one or more light source elements can be modified to change the lighting output within the light box. The user can control the environment engine 112 and see the effects of changes to the environment element parameters.

At block 510, the system can determine the positions of cameras for capturing video segment within the light box. The cameras can be automatically controlled to capture identified segments, locations, angles, and the like of the video segment.

At block 512, the system can render and output the instructions to the light box during a video segment. The rendering of the segment can be performed multiple times per second. The generated output instructions can be executed by the individual light projection elements within the light box. The rendering of the segment can be performed continuously, such that the environment engine is continually updating instructions and can output the instructions. In some embodiments, the environment engine 112 may only update instructions that change from one update to the next. In environments, where the location within the virtual environment is static, the lighting effects may still change. For example, a fire can be constantly shifting or a lamp can be flickering. At block 514, the camera data can be output to the camera system to capture the video segment.

In some embodiments, it can be beneficial to utilize a masking procedure in order to remove the light box structure from the captured video segment. For example, the light projection elements can pulse at an imperceptible rate. The system can then use the data to differentiate between the light box and the actors and/or other physical objects within the light box. A system, such as the virtual environment control application or another post-processing system can automatically remove the light box from a filmed sequence.

Overview of Computing Device

Figure 6:
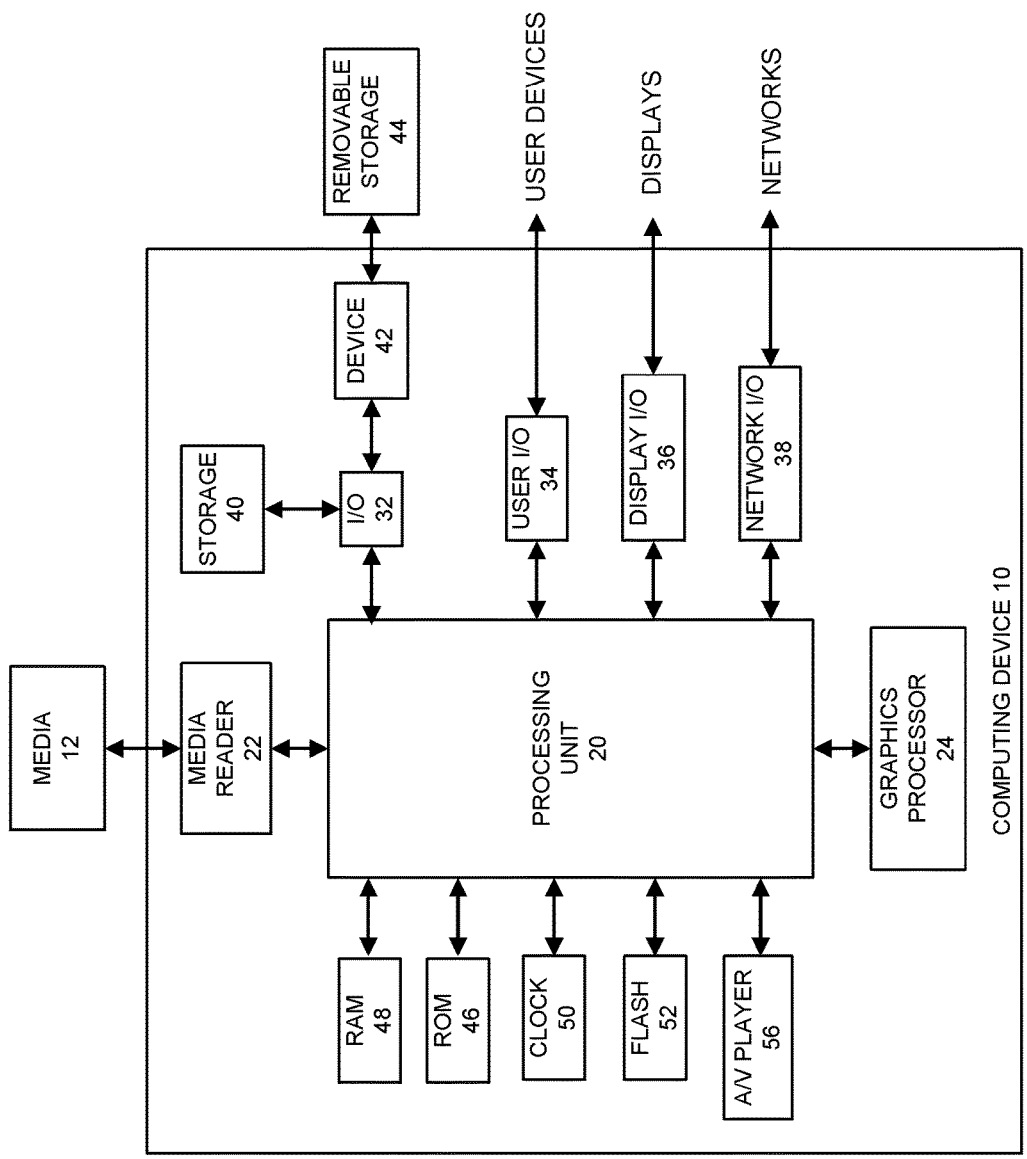
FIG. 6 illustrates an embodiment of a computing device.

FIG. 6 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for dynamically controlling the operation of a light box system, the method comprising:

by one or more hardware processors executing a light box control application,
loading a virtual environment from a data store, the virtual environment comprising one or more virtual light sources;
loading light box configuration information from a light box system, the light box configuration information identifying positions of a plurality of light projection elements disposed within the light box system;
determining a first virtual position of a representation of the light box within the virtual environment;
determining virtual lighting characteristics associated with the first virtual position of the light box within the virtual environment based, at least in part, on virtual lighting parameters of the one or more virtual light sources;
determining light output data for at least a subset of the plurality of the light projection elements based, at least in part, on the positions of the plurality of light projection elements and the determined virtual lighting characteristics of the first virtual position of the light box within the virtual environment, wherein the light output data is configured to output light within an interior of the light box system having the virtual light characteristics of the representation of the light box at the first virtual position within the virtual environment;
generating instructions to control the output of at least the subset of the plurality of the light projection elements within the light box based, at least in part, on the determined light output data.

2. The method of claim 1 further comprising generating instructions for output to a motion capture camera control system for operation of a camera system.

3. The method of claim 1, wherein the light box configuration information further comprises at least one of: physical dimensions of the light box system, a type of light projection elements, a number of light projection elements, or light emission characteristics of the plurality of light projection elements within the light box system.

4. The method of claim 1, wherein the plurality of light projection elements form an array of light projection elements.

5. The method of claim 1, wherein the light projection elements are light emitting diodes (LED).

6. The method of claim 1, wherein the generating instructions controlling the output of the plurality of the light projection elements within the light box further comprises generating instructions to control, for each of the plurality of light projection elements, at least two of: a color, a hue, a saturation, and an intensity.

7. The method of claim 1, wherein the determined light output values comprise high dynamic range lighting information.

8. The method of claim 1, further comprising:
moving from the first virtual position of the representation of the light box system within the virtual environment to a second virtual position; and
determining updated light output values for the plurality of light projection elements based, at least in part, on the second virtual position of the representation of the light box system within the virtual environment.

9. A light box control system comprising:
a data store configured to store environment data;
one or more hardware processors in communication with the data store and a light box interface, the light box system interface configured to communicate with a light box system, the hardware processors configured to execute a light box control application, the light box control application configured to:

load a virtual environment based, at least in part, on environment data stored in the data store, the virtual environment comprising at least one virtual light source;

load light box configuration information associated with the light box system, the light box configuration information identifying a plurality of light projection elements disposed within the light box system;

determine a first virtual position of a representation of the light box system within a the virtual environment;

determine virtual lighting characteristics for the first virtual position of the representation of the light box system within the virtual environment based, at least in part, on virtual lighting parameters associated with the at least one virtual light source;

calculate light output data for at least a subset of the plurality of light projection elements based, at least in part, on the light box configuration information for the plurality of light projection elements and the determined virtual lighting characteristics of the first virtual position of the representation of the light box with in the virtual environment, wherein the light output data is configured to output light within an interior of the light box system having the virtual light characteristics of the representation of the light box at the first virtual position within the virtual environment; and generate instructions configured to control the output of at least the subset of the plurality of the light projection elements within the light box system based, at least in part, on the determined light output data.

10. The system of claim 9, wherein the light box control application is further configured to provide the control instructions to the light box system through the light box interface.

11. The system of claim 9, wherein the light box control application is further configured to generate a movement path for movement of the representation of the light box system within the virtual environment during a capture segment.

12. The system of claim 9, wherein the light box control application is configured to determine the virtual lighting characteristics and generate instructions configured to control the output of the plurality of the light projection elements in real time during a capture segment.

13. The system of claim 9, wherein the plurality of light projection elements form an array of light projection elements that remains in a fixed position during a capture segment.

14. The system of claim 9, wherein the rendered virtual environment is rendered using high dynamic range lighting.

15. The system of claim 9, wherein the light projection elements are light emitting diodes (LED).

16. A non-transitory computer readable medium comprising computer-executable instructions for dynamically controlling the operation of a light box system that, when executed by a computer, cause the computer to perform a method comprising:

loading a virtual environment from an environment data store, the virtual environment comprising one or more virtual light sources;

loading light box configuration information from a light box system, the light box configuration information identifying a plurality of light projection elements disposed within the light box system;

determining a first virtual position of a representation of the light box within the virtual environment;

determining light output data for at least a subset of the plurality of the light projection elements based, at least in part, on the lighting parameters associated with the one or more virtual light sources, and the first virtual position of the representation of the light box within the virtual environment, wherein the light output data is configured to output light within an interior of the light box system having the virtual light characteristics of the representation of the light box at the first virtual position within the virtual environment; and generating, based at least in part on the determined light output data, instructions controlling the output of at least a subset of the plurality of the light projection elements within the light box.

17. The computer readable medium of claim 16 further comprising generating instructions for output to a motion capture camera control system for operation of the camera system, and rendering the virtual lighting effects is based, at least in part, on positions of a camera of the camera system.

18. The computer readable medium of claim 16, wherein generating the instructions controlling the output of at least the subset of the plurality of the light projection elements within the light box comprises generating instructions for each of the plurality of light projection elements.

19. The computer readable medium of claim 16, wherein the light box configuration information comprises at least one of: physical dimensions of the light box system, a type of light projection elements, a number of light projection elements, or position of the plurality of light projection elements within the light box system.

20. The computer readable medium of claim 16, further comprising changing the position of the representation of the light box system within the virtual environment.

* * * * *